United States Patent
Kakigi

(10) Patent No.: US 6,956,321 B2
(45) Date of Patent: Oct. 18, 2005

(54) FUNNEL FOR CATHODE RAY TUBE AND MOLD FOR MAKING THE SAME

(75) Inventor: Hiroshi Kakigi, Otsu (JP)

(73) Assignee: Nippon Electric Glass Co., Ltd., Shiga-ken (JP)

( * ) Notice: Subject to any disclaimer, the term of this patent is extended or adjusted under 35 U.S.C. 154(b) by 118 days.

(21) Appl. No.: 10/259,276

(22) Filed: Sep. 27, 2002

(65) Prior Publication Data

US 2003/0062820 A1 Apr. 3, 2003

(30) Foreign Application Priority Data

Jul. 19, 1978 (JP) .............................................. 53-26109
Sep. 28, 2001 (JP) ....................................... 2001-300968

(51) Int. Cl.[7] .............................................. H01J 29/86
(52) U.S. Cl. ............................... 313/477 R; 313/2.1 A
(58) Field of Search .................... 313/477 R; 220/2.1 A, 220/2.3 A

(56) References Cited

U.S. PATENT DOCUMENTS 5,248,914 A * 9/1993 Capek et al. ................ 313/402
6,227,394 B1 * 5/2001 Shinoda .................... 220/2.1 A

FOREIGN PATENT DOCUMENTS

| JP | 63-010447 | 1/1988 |
| JP | 08-111189 | 4/1996 |
| JP | 60-133746 | 4/1999 |
| WO | WO 01/08194 A1 | 2/2001 |

* cited by examiner

Primary Examiner—Ashok Patel
(74) Attorney, Agent, or Firm—J.C. Patents

(57) ABSTRACT

The reference surface of the positioning reference on the funnel is formed as a flat plane from a mold match line towards a small-diameter opening side. In addition, the reference surface of the positioning reference is formed in parallel with or in a direction near a central axis line of the funnel from the mold match line towards the small-diameter opening side with respect to a plane which is in parallel with the central axis line and includes the mold match line.

9 Claims, 6 Drawing Sheets

FUNNEL FOR CATHODE RAY TUBE AND MOLD FOR MAKING THE SAME

CROSS-REFERENCE TO RELATED APPLICATION

This application claims the priority benefit of Japanese application serial no. 2001-300968, filed Sep. 28, 2001.

BACKGROUND OF THE INVENTION

1. Field of the Invention

This invention relates in general to a funnel for cathode ray tube (CRT) and a mold for making same. More particularly, the invention relates to a technology for improving a positioning reference that is formed on an outer wall of a body of a funnel for cathode ray tube.

2. Description of Related Art

As well known in the conventional art, the glass bulb for cathode ray tube comprises a panel that forms a front portion and images are displayed thereon; a funnel that is located behind the panel, sealed to the panel, and a deflection yoke is externally mounted thereon; and a neck that is fusion bonded with the funnel and an electron gun is internally installed.

The panel comprises a face portion with an effective screen for displaying an image, and a skirt portion having a substantially rectangular enlarged opening that is connected to the face portion through a blend R portion and is used to seal to the funnel. The skirt portion comprises side portions each of which is between two adjacent corners among four corners.

As shown in FIG. 5, the funnel 1 comprises a substantially rectangular enlarged opening (seal edge surface) 2 to be sealed to the panel, and a substantially circular small-diameter opening 3 to be fusion bonded with the neck. The body portion 4 of the funnel 1 using the tube axis X as a central axis line has body structures 4a, and each body structure 4a that exists between two adjacent corners 5 among four corners 5 at the side of the enlarged opening 2 is gradually shrunk towards the side of the small-diameter opening 3. In addition, the neck is substantially a cylindrical shape.

As a cathode ray tube, in order to obtain a structure for displaying a proper image without color deviation, etc., it is important that the central axis lines of the panel, the funnel and the neck are accurately positioned one another with respect to the tube axis of the glass bulb and then assembled together. Therefore, a plurality of positioning references 6 (three entities, for example), which is in contact with fixtures to determine a position relative to the panel when the funnel is sealed to the panel, is disposed on the adjacent body structures 4a of the funnel 1. The positioning reference 6 is made in a convex shape whose top portion has a reference surface 6a that contacts with the fixture. The reference surface 6a is formed in such a manner that a predetermined distance is set from the central axis line of the funnel.

In addition, as shown in FIG. 6, when manufacturing the funnel 1, after a high-temperature molten glass gob is provided to a female mold comprising a bottom mold 7 and a shell mold 8, a plunger 9 as a male mold is moved downwards to press and extend the glass gob. After the molten glass gob is formed into predetermined shape, the plunger 9 is moved upwards. Furthermore, after the shell mold 8 is removed, the funnel 1 is removed out of the bottom mold 7.

In this situation, a molding portion corresponding to the positioning reference 6 is formed as a recess portion on the bottom mold 7. In addition, considering the easiness of taking the funnel 1 out of the bottom mold 7 after being molded, the molding portion corresponding to the positioning reference 6 is formed on the uppermost portion of the bottom mold 7 in a status that the upper portion is open. Therefore, the positioning reference 6 is located in the vicinity of a mold match line M formed by the mold matching of the bottom mold 7 and the shell mold 8.

In addition, it is a common example that the reference surface 6a of the positioning reference 6 is formed in substantially parallel with the central axis line X of the funnel 1. The shapes of the positioning reference 6 have types as shown in FIGS. 7A and 7B, for example. As shown in FIG. 8, for any above type of the positioning reference 6, the edge 6b (front edge, hereinafter) at the side of the seal edge surface 2 of the reference surface 6a is formed by projecting from an outer side of the mold match line M (a side away from the central axis line X, following is the same). For example, the projection dimension L from the mold match line M to the front edge 6b of the reference surface 6a can be set about 1.5 mm~2.5 mm.

The aforementioned projection dimension L is previously set by predicting a dimension unevenness generated when the funnel 1 is pressed to form, so that currently, the value of the projection dimension L is determined according to operator's experience. Furthermore, as shown in FIG. 9, when molding the positioning reference 6, a sliding plate 21, at a front end of which a molding surface 21a for molding the reference surface 6a of the positioning reference 6 is provided, is fitted slidably in the x-y direction into a slit 20 formed at the uppermost part of the bottom mold 7. The position of the sliding plate 21 is suitably adjusted to secure a proper dimension accuracy of the reference surface 6a.

Conventionally, the reference surface 6a of the positioning reference 6 is projected more outwards than the mold match line M by about 1.5 mm~2.5 mm, causing following problems.

Since the glass thickness of the forming portion of the positioning reference 6 on the funnel 1 is overly thick in comparison with the other portions, when press molding of the molten glass gob, the temperature balance in the vicinity of the positioning reference 6 is degraded, there might be possibilities of dimensional defects and deformation. In addition, since the positioning reference 6 becomes a cause to interfere the flow of the molten glass, the drawback such as sag or tip on the glass is caused.

In addition, since the positioning reference 6 is formed by the molten glass at the final stage of the pressing and extending by the plunger 9, wrinkles, etc. might be possibly created thereon because the fluidity of the molten glass is decreased.

Furthermore, in a slidable mold such as using the aforementioned sliding plate 21, when the sliding plate 21 is made to move in the X direction, an acute angle gap is formed between the front end of the sliding plate 21 and the recess 22 of the bottom mold 7. In addition, even when the sliding plate 21 is made to move in the Y direction, a tiny gap also exists between the sliding plate 21 and the slit 20. As a result, tiny angular protrusions or tiny line-shaped protrusions are formed on the border of the reference surface 6a. These do not only become the causes of creating the crack, etc., but the quality deterioration or the degradation of molding yield is caused.

SUMMARY OF THE INVENTION

According to the foregoing description, object of this invention is to provide a funnel for cathode ray tube, wherein the degradation of the glass temperature balance or the degradation of the glass flow in the vicinity of the positioning reference when the funnel is molded can be suppressed as much as possible, thereby, the occurrence of sag or tip on the glass can be prevented, in addition, the wrinkles, etc. caused by interfering the fluidity of the molten glass can be prevented from occurring.

According to the object mentioned above, the present invention provides a funnel for cathode ray tube. The funnel comprises a body portion; an enlarged opening that is substantially a rectangular shape and formed at one end of the body portion; a small-diameter opening that is substantially a circular shape and formed at the other end of the body portion; a mold match line formed near the enlarged opening by a mold matching of a mold; and positioning references formed on an outer wall of the body portion for determining the position when a panel for the cathode ray tube is sealed to the funnel. Moreover, the reference surface of the positioning reference is formed as a flat plane that continues from the mold match line towards the small-diameter opening side.

According to the above structure, since the reference surface of the positioning reference is formed as a flat plane (including a substantially flat plane) that is continuous from the mold match line, i.e., since the front edge of the reference surface is consistent with the mold match line, the front edge of the reference surface does not project to the outer side of the mold match line as the conventional structure. Therefore, the formed portion of the positioning reference on the funnel has a thickness that is not larger too much than the thickness of the other portion. Therefore, the temperature balance in the vicinity of the positioning reference during the press molding process is good, and the drawbacks such as dimensional defects or deformation can be avoided. In addition, the flow interference of the molten glass due to the existence of the positioning reference can be ignored, and therefore, the occurrence probability of sag or tip on the glass can be dramatically reduced.

Moreover, though the positioning reference is molded from the molten glass at the final stage of being pressed and extended by the mold, since the periphery of the positioning reference is not a tangled shape like the conventional structure, the probability of creating the wrinkles, etc. can be significantly reduced. Even though the fluidity of the molten glass is interfered, it is not a main cause to degrade the molding property.

In this case, the reference surface of the positioning reference is parallel with a central axis line of the funnel, and is preferably formed from the mold match line towards the small-diameter opening side in parallel with the central axis line of the funnel or in a direction near the central axis line with respect to a plane including the mold match line, i.e., a status not protruding from the above plane. More clearly, the reference surface of the positioning reference is substantially parallel with a central axis line of the funnel. However, in view of a good property of taking the funnel out of the mold, the reference surface of the positioning reference is preferably formed in parallel with the central axis line, and does not project in the direction away from the central axis line of the funnel with respect to a plane including the mold match line. In this way, when taking the funnel out of the mold, the drawback that is scratch made on the reference surface of the positioning reference can be firmly avoided.

In addition, the reference surface of the positioning reference is preferably molded by a molding portion that is integrally formed on a molding surface of a mold corresponding to the outer wall of the body portion. According to this, since the gap as in the conventional slidable mold does not exist on the molding portion of the mold corresponding to the positioning reference, tiny angular protrusions or tiny line-shaped protrusions are not formed on the border of the reference surface. Therefore, the occurrence of crack or tip on the glass can be suppressed, and the quality improvement or the molding yield can be further improved.

Furthermore, marking are preferably set in the vicinity of the reference surface of the positioning reference. For example, the markings are formed on predetermined positions in the vicinity of the reference surface by a etching process utilizing the erosion ability of acid, or is formed by sand blast in such a manner that the surface roughness of the positions in the vicinity of the reference surface is different from that of the other portions. In this way, the protruding dimension to the outer side is short and not prominent to the human eyes, but the formed position of the positioning reference 6 can be visually confirmed by the markings. Therefore, when the position matching process is performed to seal the funnel to the panel, the work error due to the formed position of the positioning reference 6 being not able to grasp can be effectively avoided.

In addition, the invention further provides the mold for molding the funnel for the cathode ray tube, wherein the funnel comprises reference surface that is formed in a flat plane continuing from the mold match line. The mold comprises a female mold and a male mold. The female mold further comprises a bottom mold where a molding surface corresponding to the outer wall of the body portion is formed thereon, and a shell mold where a molding surface corresponding to the enlarged opening is formed thereon. In the female mold, a molten glass gob is provided therein. The male mold is relatively close to the female mold for pressing and extending the molten glass gob. The molding surface of the bottom portion corresponding to the outer wall of the body portion is integrally formed with a molding portion corresponding to the positioning reference.

According to this structure, the molding portion for the positioning reference is integrally formed on the molding surface of the bottom mold in such a manner that the molding portion for the reference surface of the positioning reference continues from the mold matching part to the shell mold corresponding the mold match line. Therefore, when the bottom mold is used to mold the funnel, since the gap as in the conventional slidable bottom mold does not exist on the molding portion for the positioning reference, after the molding process, tiny angular protrusions or tiny line-shaped protrusions are not formed on the border of the reference surface. Therefore, the occurrence of crack or tip can be suppressed, and the quality improvement or the molding yield can be further improved.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The preferred embodiment of the present invention is described in detail accompanying with the attached drawings, FIGS. 1~4. In addition, elements same as those have been described in FIGS. 5~9 are labeled with the same numbers, and their corresponding descriptions are omitted.

Figure 1:
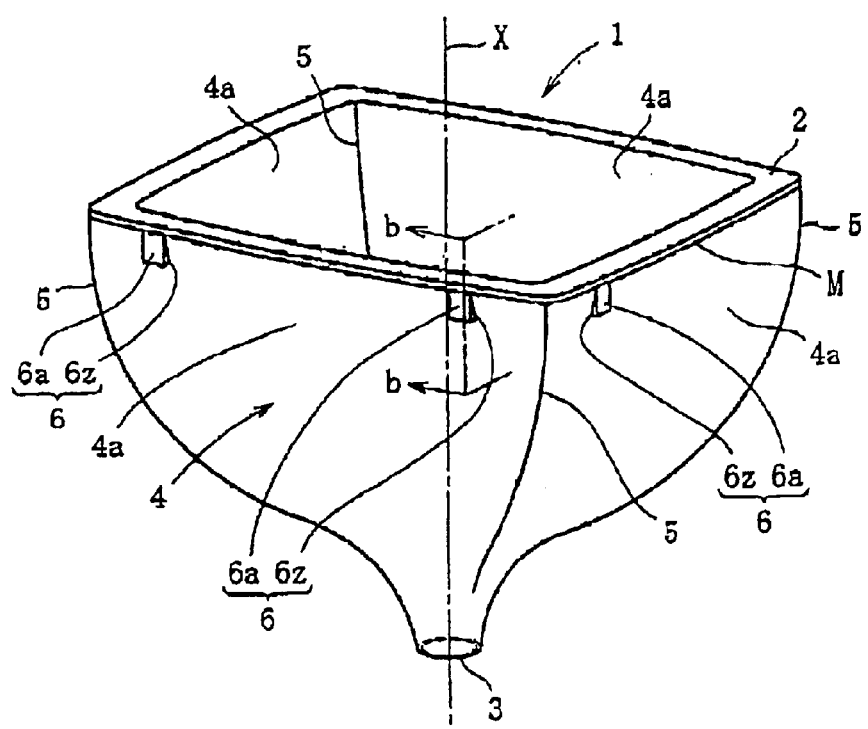
FIG. 1 is a perspective view showing an entire structure of a funnel for cathode ray tube according to the preferred embodiment of the invention.

As shown in FIG. 1, the funnel 1 for the cathode ray tube (for simplicity, refer to the funnel, hereinafter) comprises positioning references 6 that are respectively located at two positions on one side of the body structure 4a, and at one position on the other side of the body structure 4a, wherein the two adjacent sides of the body structure 4a sandwiches one of the corners 5. The reference surface 6a is a flat plane that continues from the mold match line M towards the small-diameter opening 3, and is not a polished surface where a mechanical process such as polishing or a grinding process is not performed thereon.

Figure 2:
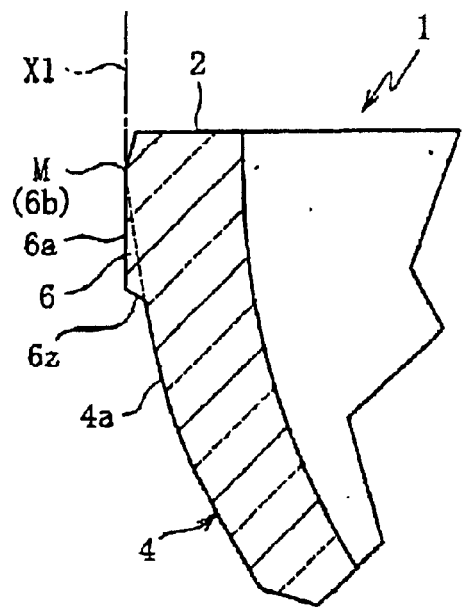
FIG. 2 is a vertically enlarged cross-sectional view cut along the line b—b in FIG. 1.

The reference surface 6a of the positioning reference 6, as shown in FIG. 2, is formed substantially in parallel with the central axis line X of the funnel 1, within a range without projecting to an outer side with respect to an imaginary plane X1 which is in parallel with the central axis line X and includes the mold match line M. Therefore, the front edge 6b of the reference surface 6a of the positioning reference 6 is consistent with the mold match line M, and the dimension where the entire region of the positioning reference 6 projects from the outer wall of the body structure 4a to the outer side is shorter than the conventional structure by about 1.5 mm for the type shown in FIG. 3a and about 2.5 mm for the type shown in FIG. 3b, for example.

The angle that the outer wall of the body structure 4a of the funnel 1 forms with the central axis line X or the imaginary plane X1 becomes to be gradual as going from the enlarged opening 2 side to the small-diameter opening 3 side. Thus, when the positioning reference 6 is formed as described above in such a manner that the reference surface 6a continues to the mold match line M, advantageously, the projection dimension of the entire region of the positioning reference 6 from the outer wall of the body structure 4a to the outer side can be shortened, as compared with that the positioning reference 6 is formed to separate toward the small-diameter opening 3 side from the mold match line M.

Figure 3A:
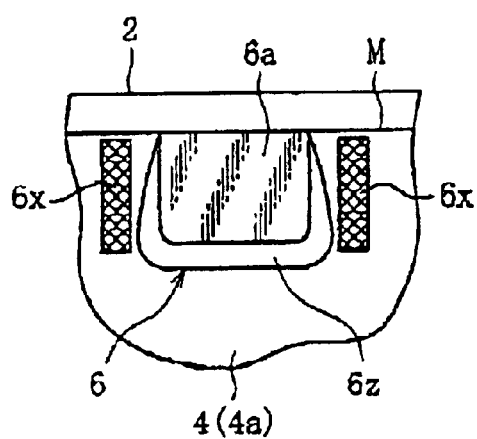
FIGS. 3a and 3b are schematic front views showing the positioning reference, respectively.

Furthermore, as shown in FIG. 3a, long markings 6x (that are longer in parallel with the central axis line X) are set nearby the reference surface 6a of the positioning reference 6, or more clearly, nearby the left and right sides (two sides in a direction along a seal edge surface 2) of the positioning reference 6 on the outer wall of the body structure 4a. The markings 6x are formed by an etching process that utilizes erosion ability of acid, or by sand blast in such a way that the surface roughness of the markings 6x is different from the surface roughness of the other positions on the outer wall of the body structure 4a. In addition, the position where the markings 6 are set thereon is not limited to nearby the left and the right sides of the positioning reference 6. For example, the markings 6x nearby the small-diameter opening 3 side of the positioning reference 6 can be also set instead, or together with the markings 6x nearby the left and the right sides of the positioning reference 6. Moreover, the same markings 6x are also set nearby the positioning reference 6 for the type shown in FIG. 3b.

Figure 3B:
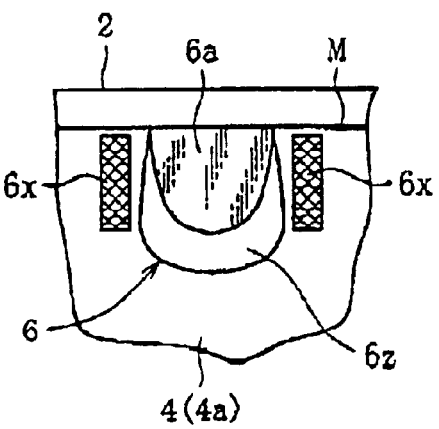
Figure 7A:
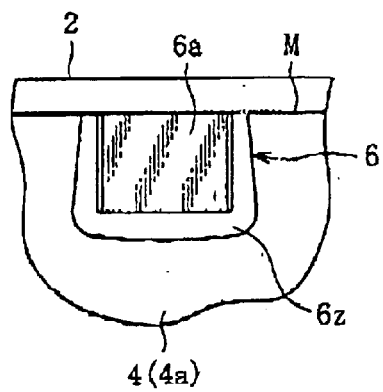
FIGS. 7a and 7b are schematic front views showing the conventional positioning reference, respectively.
Figure 7B:
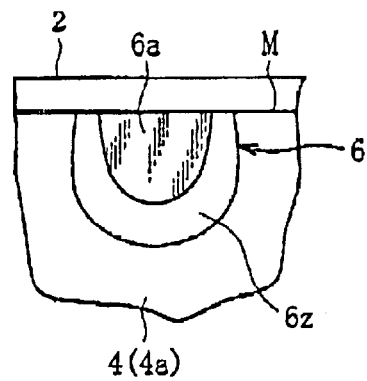
Figure 8:
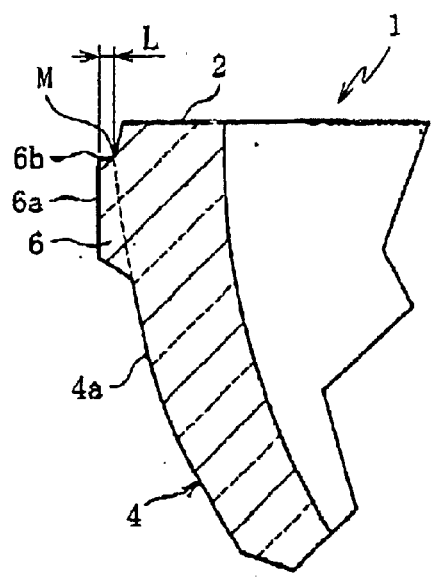
FIG. 8 is a vertically enlarged cross-sectional view cut along the line B—B in FIG. 5.
Figure 9:
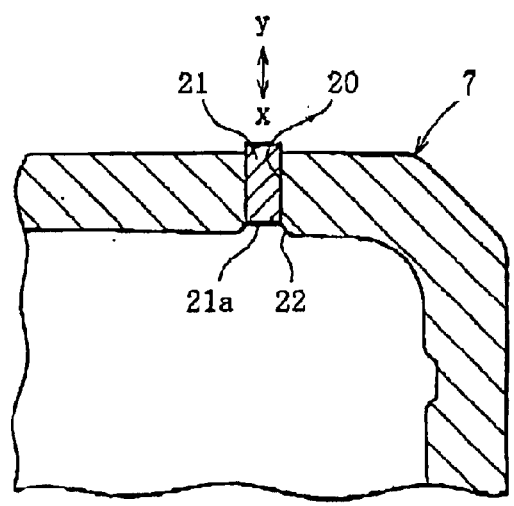
FIG. 9 is a horizontally cross-sectional view showing the mold for making funnel for cathode ray tube according to the conventional example.

In addition, as shown in FIGS. 3a and 3b, a rising portion 6z that is smoothly rose from the outer wall of the body structure 4a with respect to the reference surface 6a of the positioning reference 6 has a narrower width as compared with the conventional structure shown in FIGS. 7a and 7b. That is, as compared with the conventional example shown in FIG. 8, since the reference surface 6a of the positioning reference 6 according to the embodiment of the invention does not protrude from the mold match line M to the outer side, the rising portion 6z to make the reference surface 6a smoothly continue to the outer wall of the body structure 4a can be also reduced. Therefore, even though the area of the reference surface 6a is the same, the area of the positioning reference 6 is smaller than that of the conventional example.

Furthermore, as described above, the angle that the outer wall of the body structure 4a of the funnel 1 forms with the central axis line X or the imaginary plane X1 becomes to be gradual as going from the enlarged opening 2 side to the small-diameter opening 3 side. By the reference surface 6a of the positioning reference 6 continues to the mold match line M, there can be an advantage that a connection portion, such as a rising portion, to make the enlarged opening 2 side of the reference surface 6a smoothly continue to the outer wall of the body structure 4a is not required to form. In contrast, when the positioning reference 6 is formed to separate toward the small-diameter opening 3 side from the mold match line M, a connection portion to make the enlarged opening 2 side of the reference surface 6a smoothly continue to the outer wall of the body structure 4a is required. Therefore, there are disadvantage and inconvenience that the design and the manufacture for the molding surface of the mold 10 becomes so complicated.

Figure 4:
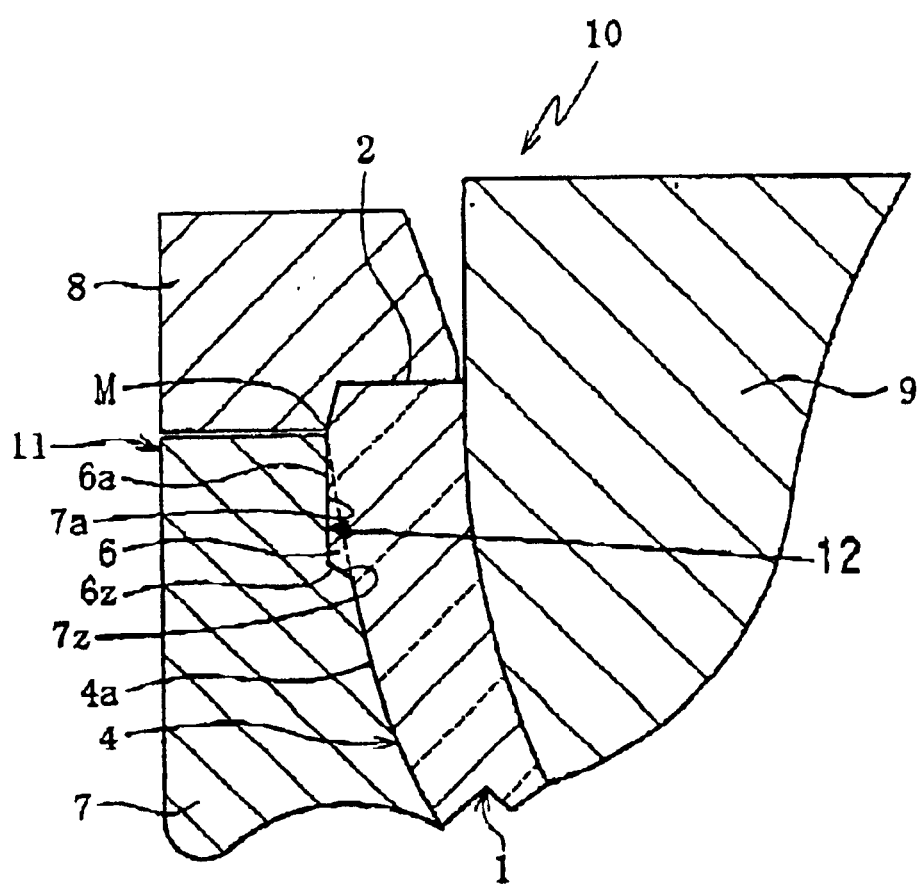
FIG. 4 is a vertically cross-sectional view showing the funnel for cathode ray tube and the mold for making the same according to the preferred embodiment of the invention.
Figure 5:
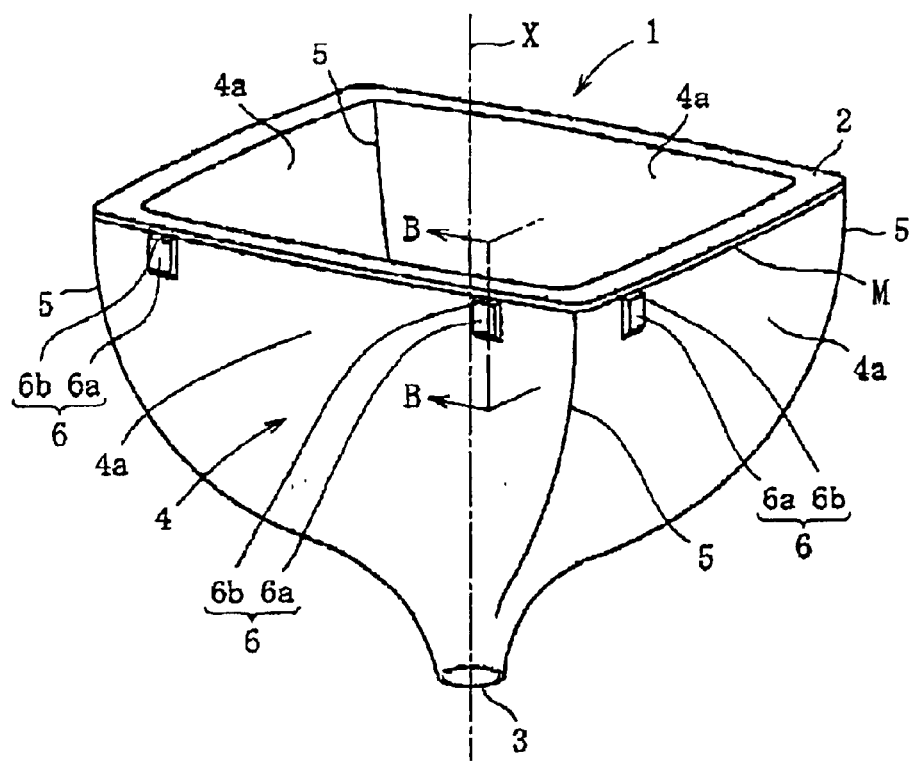
FIG. 5 is a perspective view showing an entire structure of a funnel for cathode ray tube according to a conventional example.
Figure 6:
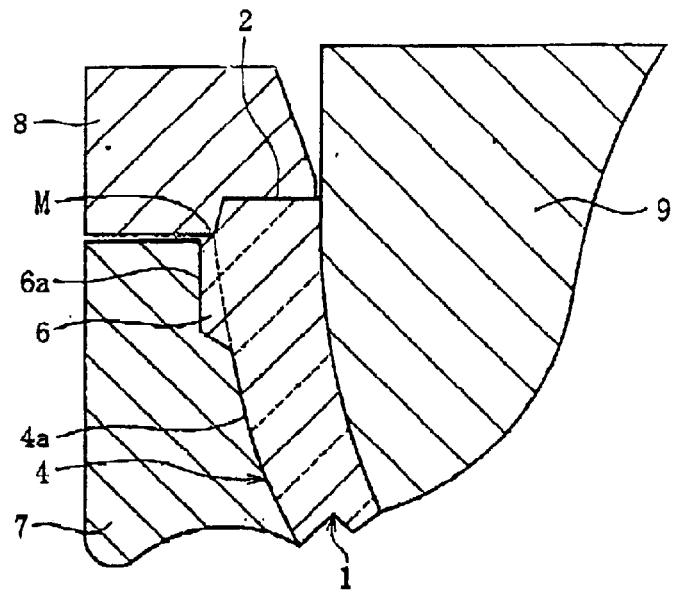
FIG. 6 is a vertically cross-sectional view showing the funnel for cathode ray tube and the mold for making the same according to the conventional example.

On the other hand, as shown in FIG. 4, the mold for manufacturing the funnel 1 according to the embodiment of the invention comprises a female mold 11 and a plunger 9 as a male mold. The female mold 11 comprises a bottom mold 7 in which a molten glass gob is supplied, and a shell mold 8 disposed over the bottom mold 7 movably upwards and downwards. The plunger 9 is disposed over the female mold 11 movably upwards and downwards. Under a condition that the shell mold 8 contacts with, or substantially contacts with the upper end of the bottom mold 7, the molten glass gob is pressed and extended by lowering the plunger 9. In this way, a press molding process for funnel 1 is executed.

The bottom mold 7 has a molding surface for prescribing an exterior shape of the funnel 1, and on the other hand, the plunger 9 has a molding surface for prescribing an interior shape of the funnel 1. In addition, the shell mold 8 has a molding surface for prescribing the enlarged opening 2 of the funnel 1.

Molding surfaces 12 corresponding to the positioning references 6 of the funnel 1 are integrally formed on the molding surface of the bottom mold 7, at two positions on one side and at one position on the other side of the two adjacent edges sandwiching one of the corners. The lower edge of the shell mold 8 can be close to or away from the upper edge of the molding surface of the bottom portion 7, and the upper edge and the lower edge are formed in the same outline. On the molding surface 12, a portion corresponding to the reference surface 6a of the positioning reference 6 is a hanging down surface 7a that is substantially hung downwards from the upper edge of the molding surface of the bottom mold 7, and a portion corresponding to the rising portion 6z of the positioning reference 6 is an inclined surface (or a curved surface) 7z that continues to the left side, the right side, and the down side of the hanging down surface 7a.

When the mold 10 is used to press mold the funnel 1, the molten glass gob is provided to the bottom mold 7, and then the plunger 9 is lowered. As shown in FIG. 4, the molten glass gob is pressed and extended by the bottom mold 7, the shell mold 8 and the plunger 9 to mold the shape of the funnel 1. After being molded, the plunger 9 is lifted and then the shell mold 8 is further lifted, the funnel 1 is cooled and removed from the bottom mold 7. At this time, the press molding process is finished. In this way, the funnel 1 shown in FIGS. 1 and 2 is obtained.

During the press molding process, as the plunger 9 moves downwards, the molten glass gob is pressed and extended to climb upwards along the molding surface of the bottom mold 7, and then to reach the molding portions 7a, 7z (the hanging downing surface and the inclined surface) corresponding to the positioning reference 6. When reaching the molding portions 7a, 7z, the fluidity of the molten glass gob is decreased so that wrinkles are easily created when molding the positioning reference 6. However, the recess amount of the molding portions 7a, 7z corresponding to the positioning reference 6 is fewer than that of the conventional example, and its shape is not so complicated. Therefore, the probability of creating the wrinkles, etc. can be reduced. Furthermore, since the degradation of the temperature balance at the periphery of the molding portions 7a, 7z corresponding to the positioning reference 6 is alleviated, drawbacks such as dimensional defects or deformation at the periphery of the positioning reference 6 can be suppressed from occurring. In addition, an interference of the molten glass gob due to the existence of the molding portions 7a, 7z corresponding to the positioning reference 6 is almost not caused, so that the molding ability can be improved.

Moreover, the molding portions 7a, 7z corresponding to the positioning reference 6 is parallel with the central axis line of the bottom mold 7 and does not project in a direction away from the central axis line of the bottom mold 7 with respect to the surface that includes an inner line (a line corresponding to the mold match line M) of a mold matching part between the bottom mold 7 and the shell mold 8. Therefore, when the funnel 1 is removed out of the bottom mold 7, the ability to take out the glass becomes better, and the inconvenience that scratch is made on the reference surface 6a of the positioning reference 6 can be avoided. In addition, since the molding portions 7a, 7z corresponding to the positioning reference 6 is integrally formed with the molding surface of the bottom mold 7, the gap when the conventional movable bottom portion is used does not exist and tiny angular protrusions or tiny line-shaped protrusions are not formed on the border of the reference surface 6a.

Moreover, after the press molding process, the markings 6x are set in the vicinity of the reference surface 6a of the positioning reference 6, for example, by etching the region nearby the positioning reference 6 of the funnel 1. Therefore, even though the protrusion dimension of the positioning reference 6 to the outer side is short so that the positioning reference 6 is not prominent to the human eyes, the formed position of the positioning reference 6 can be visually confirmed by the markings 6x. In this way, when the position matching process is performed to seal the funnel 1 to the panel, the work error due to the formed position of the positioning reference 6 being not able to grasp can be avoided. In addition, during the press molding process, the markings 6x can be also set by making the surface roughness of the region nearby the periphery of the molding portions 7a, 7z corresponding to the positioning reference 6 to be different from the surface roughness of the other molding portion surrounding the molding portions 7a, 7z.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A funnel for a cathode ray tube, comprising:

a body portion;

an enlarged opening, substantially a rectangular shape and formed at one end of the body portion;

a small-diameter opening, substantially a circular shape and formed at the other end of the body portion;

a mold match line, formed near the enlarged opening by a mold matching of molds, the mold match line of the body portion residing at an outer wall of the body portion and extending along a whole circumference of the body portion;

positioning references, formed on an outer wall of the body portion for determining the position when a panel for the cathode ray tube is sealed to the funnel;

wherein a reference surface of the positioning references is formed as a flat plane that continues from the mold match line towards the small-diameter opening side; and wherein a front edge of the reference surface at the side of the enlarged opening is consistent with the mold match line.

2. The funnel according to claim 1, wherein the reference surface of the positioning reference is formed in parallel with or in a direction near a central axis line of the funnel from the mold match line towards the small-diameter opening side with respect to a plane which is in parallel with the central axis line and includes the mold match line.

3. The funnel according to claim 1, wherein the reference surface of the positioning reference is molded by a molding portion that is integrally formed on a molding surface of the mold corresponding to the outer wall of the body portion.

4. The funnel according to claim 2, wherein the reference surface of the positioning reference is molded by a molding portion that is integrally formed on a molding surface of the mold corresponding to the outer wall of the body portion.

5. The funnel according to claim 1, wherein a marking is set nearby the reference surface of the positioning reference.

6. The funnel according to claim 2, wherein a marking is set nearby the reference surface of the positioning reference.

7. The funnel according to claim 3, wherein a marking is set nearby the reference surface of the positioning reference.

8. The funnel according to claim 4, wherein a marking is set nearby the reference surface of the positioning reference.

9. The funnel according to claim 1, wherein the reference surface of the positioning reference does not project outward beyond a plane which is in parallel with the central axis line and includes the mold match line.

* * * * *